(12) United States Patent
Dutton et al.

(10) Patent No.: US 7,917,741 B2
(45) Date of Patent: Mar. 29, 2011

(54) ENHANCING SECURITY OF A SYSTEM VIA ACCESS BY AN EMBEDDED CONTROLLER TO A SECURE STORAGE DEVICE

(75) Inventors: Drew J. Dutton, Austin, TX (US); Alan D. Berenbaum, New York, NY (US); Richard E. Wahler, St. James, NY (US); Raphael Weiss, Plainview, NY (US)

(73) Assignee: Standard Microsystems Corporation, Hauppauge, NY (US)

( * ) Notice: Subject to any disclaimer, the term of this patent is extended or adjusted under 35 U.S.C. 154(b) by 1022 days.

(21) Appl. No.: 11/733,599

(22) Filed: Apr. 10, 2007

(65) Prior Publication Data
US 2009/0327678 A1 Dec. 31, 2009

(51) Int. Cl.
| | |
|---|---|
| G06F 9/00 | (2006.01) |
| G06F 15/177 | (2006.01) |
| G06F 1/24 | (2006.01) |
| G06F 21/00 | (2006.01) |
| G06F 12/14 | (2006.01) |
| G06F 7/04 | (2006.01) |
| G06F 17/30 | (2006.01) |
| G08B 29/00 | (2006.01) |

(52) U.S. Cl. .............. 713/1; 713/2; 713/100; 713/186; 713/194; 726/2; 726/28; 726/34

(58) Field of Classification Search .............. 713/1, 2, 713/100, 186, 194; 726/2, 28, 34
See application file for complete search history.

(56) References Cited

U.S. PATENT DOCUMENTS

| 6,564,318 | B1 | 5/2003 | Gharda et al. |
| 7,051,196 | B2 * | 5/2006 | Angelo et al. ............. 713/1 |
| 2002/0166059 | A1 * | 11/2002 | Rickey et al. ............. 713/200 |
| 2004/0064457 | A1 * | 4/2004 | Zimmer et al. ............. 707/100 |
| 2005/0071624 | A1 | 3/2005 | Rothman et al. |
| 2005/0081071 | A1 | 4/2005 | Huang et al. |
| 2005/0138409 | A1 * | 6/2005 | Sheriff et al. ............. 713/200 |
| 2005/0228993 | A1 * | 10/2005 | Silvester et al. ............. 713/168 |
| 2006/0010317 | A1 | 1/2006 | Lee |
| 2007/0038856 | A1 * | 2/2007 | Ali et al. ............. 713/164 |
| 2007/0234073 | A1 * | 10/2007 | Cromer et al. ............. 713/193 |
| 2008/0077986 | A1 * | 3/2008 | Rivera et al. ............. 726/20 |
| 2008/0098478 | A1 * | 4/2008 | Vaidya et al. ............. 726/24 |
| 2008/0104381 | A1 * | 5/2008 | Peacock et al. ............. 713/1 |
| 2008/0106366 | A1 * | 5/2008 | Zhang et al. ............. 340/5.1 |
| 2008/0244257 | A1 * | 10/2008 | Vaid et al. ............. 713/2 |

* cited by examiner

*Primary Examiner* — Ji H Bae
(74) *Attorney, Agent, or Firm* — Meyertons Hood Kivlin Kowert & Goetzel, P.C.; Jeffrey C. Hood; Mark S. Williams

(57) ABSTRACT

System and method for performing pre-boot security verification in a system that includes a host processor and memory, an embedded microcontroller with an auxiliary memory, e.g., an on-chip ROM, or memory controlled to prohibit user-tampering with the contents of the memory, and one or more pre-boot security components coupled to the embedded microcontroller. Upon power-up, but before host processor boot-up, the embedded microcontroller accesses the auxiliary memory and executes the program instructions to verify system security using the one or more pre-boot security components. The one or more pre-boot security components includes at least one identity verification component, e.g., a smart card, or a biometric sensor, e.g., a fingerprint sensor, a retinal scanner, and/or a voiceprint sensor, etc., and/or at least one system verification component, e.g., TPM, to query the system for system state information, and verify that the system has not been compromised.

14 Claims, 3 Drawing Sheets upon power-up, but before host processor boot-up, an embedded microprocessor coupled to the host processor accesses an auxiliary memory that stores program instructions for verifying system security, and executes the program instructions to verify system security using one or more pre-boot security components coupled to the embedded microprocessor
302

if system security is verified, invoke boot-up of the host processor
304

FIG. 3

ENHANCING SECURITY OF A SYSTEM VIA ACCESS BY AN EMBEDDED CONTROLLER TO A SECURE STORAGE DEVICE

BACKGROUND OF THE INVENTION

1. Field of the Invention

This invention relates generally to the field of device security, and more specifically to use of an embedded microcontroller to perform pre-boot and security functions in a system.

2. Description of the Related Art

Increasingly, computers are under threat of malicious tampering or intrusion, e.g., from unauthorized users, either locally or over networks. Identity theft, theft of secrets and similar crimes are made easier by electronic access and the portability of machines. Commensurate with this trend, there is a desire for users to perform financial transactions from their personal computers (PCs). However, the current PC architecture is not secure. The current industry response is to use solutions from industry leaders, along with a device called a Trusted Platform Module (TPM) to better secure secrets within the PC. The most vulnerable time for a PC is during the initial start-up, when the PC must detect if the PC has been tampered with while the power was off, and then and only then boot the machine and allow a user or application to access data on the PC.

One current solution to this problem utilizes the system central processing unit (CPU) and system BIOS (basic I/O service) software. For example, Phoenix Technologies provides a product called TrustedCore, which is firmware that works to establish what is called the "root of trust". A drawback to this solution is that the system BIOS contains the software that must establish the root of trust. One issue with using the host CPU running BIOS code is that the BIOS is generally stored in an external flash memory which is easily modified by a user. A malicious user could substitute BIOS code that either ignores security or steals secrets, and so a conventional system cannot be trusted to perform the security authorization. Said another way, the BIOS code runs on the main CPU that is trying to be protected. Thus, an intruder could modify the BIOS code that resides in an industry standard flash device, and the root of trust could be broken without the system knowing it.

Thus, in current approaches, the system that is responsible for testing for such tampering is also the system subject to attack. Therefore, a careful attack could disable this self-test.

Other corresponding issues related to the prior art will become apparent to one skilled in the art after comparing such prior art with the present invention as described herein.

SUMMARY OF THE INVENTION

Various embodiments of a system and method for securing a system are presented. The system, e.g., a computer system, may include a host processor and memory.

First, upon power-up, but before host processor boot-up, an embedded microcontroller coupled to the host processor and memory may access an auxiliary memory that stores program instructions for verifying system security, and execute the program instructions to verify system security using one or more pre-boot security components coupled to the embedded microcontroller. For example, in one embodiment, the one or more pre-boot security components may include at least one identity verification component, e.g., a smart card, or a biometric sensor, e.g., a fingerprint sensor, a retinal scanner, and/or a voiceprint sensor, among others. The auxiliary memory may be an on-chip ROM, or memory controlled or protected in such a way as to prohibit user-tampering with the contents of the memory. The auxiliary memory may store program instructions, e.g., one or more applications, that are executable to perform security functions for the system.

The program instructions may be executable by the embedded processor to invoke the at least one identity verification component to receive identification information from a user, and verify that the user is authorized to use the system. For example, in some embodiments, the system may include template memory that stores template identification information for authorized users, such as personal data that may be compared to identify information provided by a smart card or other personal identification medium, and/or, in the case of biometric sensors, a reference fingerprint, retina pattern, or voiceprint, among others. The program instructions may thus be executable to receive (i.e., acquire) the identification information from the user via the at least one identity verification component, e.g., personal data from a smart card, a fingerprint from the user, etc., and compare this information to that stored in the template memory to determine if the user is authorized to use the system.

In some embodiments, the one or more pre-boot security components may include at least one system verification component. The program instructions (e.g., applications) may be executable by the embedded processor to invoke the at least one system verification component to query the system for system state information, and verify that the system has not been compromised. For example, one exemplary system verification component is a TPM (Trusted Platform Module), which may be used to perform various system security functions. In some embodiments, the TPM may provide a toolkit comprising various functions (and/or data) that may be invoked or otherwise used by the program instructions or applications stored in the auxiliary memory (e.g., the ROM). For example, the microcontroller may execute an application (e.g., from ROM) to verify the system BIOS, e.g., via a cryptographic hash of the BIOS memory contents, as is well known in the art. Note that this functionality is facilitated by the microcontroller's direct access to BIOS.

In some embodiments, the system may store reference system state information, e.g., in template memory or some other secure storage medium. In some embodiments, the reference system state information may include information regarding the last known secure signature of the system (or some portion of the system). To verify that the system has not been compromised, the program instructions may be executable by the embedded processor to compare the system state information queried by the at least one system verification component with the stored reference system state information. If the queried information matches or is in accordance with the stored reference system state information, the system (or some part of the system) may be considered secure or uncompromised. Thus, for example, the embedded microcontroller may retrieve and use this information to ensure that the system BIOS and other key parts of the system have not been compromised, i.e., tampered with. Of course, any other sub-systems of the system may be verified against tampering, etc., as desired, e.g., contents of a hard drive, ROM, etc.

As another example of system security verification, in one embodiment, the one or more pre-boot security components may include a GPS (global positioning system). To verify system security using the one or more pre-boot security components, the program instructions may be executable by the embedded processor to invoke the GPS to determine the location of the system, and verify that the system is at an authorized location. For example, one or more authorized locations may be stored in a secure storage medium (e.g., the template memory, the TPM, etc.), and the microcontroller may execute the program instructions to compare the determined location of the system with the one or more authorized locations to determine if the system is at an authorized location.

It should be noted that any of the above-described components (and others) may be used singly or in conjunction as desired. For example, in some embodiments, the TPM may be used to verify biometric data, e.g., fingerprint data, personal data acquired from a smart card, and so forth. Thus, a TPM may be considered to be both an identity verification component and a system verification component.

Then, if system security is verified, boot-up of the host processor may be invoked. For example, in some embodiments, the embedded processor may invoke or orchestrate the boot-up process for the host processor, e.g., invoking or calling a bootloader program, e.g., from the BIOS memory. Alternatively, in other embodiments, the host CPU boot process may be managed by another part of the system (besides the embedded microcontroller), in which case, if system security is verified, the microcontroller may permit the boot-up process for the host CPU to launch and proceed.

In some embodiments, the embedded microcontroller may be further operable to execute the program instructions to invoke one or more defensive measures if system security cannot be verified. For example, the one or more defensive measures may include preventing user access to the system, such as, for example, by preventing the host CPU from booting by blocking access to the BIOS, and/or by shutting down the power supply to the system. As another example, the one or more defensive measures may include alerting an external system coupled to the system. In some embodiments, the system may log all user input or interactions with the system for later analysis.

In some embodiments, the microcontroller may independently control access to devices, e.g., if access is critical to system security, and if the system is designed so that access to devices is provided through the microcontroller. Because the processor inside the microcontroller runs its own applications (e.g., from ROM), it may verify access rights to the devices, e.g., by using a TPM attached to one of its subsidiary buses (e.g., a VLPC bus). If the rights do not exist, access to the devices may be blocked without any modifications required to system software. Thus, in one embodiment, the embedded microcontroller may be further operable to execute the program instructions to control access to one or more devices coupled to the system. The one or more defensive measures taken when system security cannot be verified may thus include blocking access to the one or more devices. For example, as noted above, in one embodiment, at least one of the one or more pre-boot security components is or includes a TPM, and the one or more devices may include at least one other of the one or more pre-boot security components. To verify system security using the one or more pre-boot security components, the microcontroller may be operable to execute the program instructions to verify access rights using the TPM (and, as noted above, block access to the at least one other device if system security cannot be verified).

Thus, embodiments of the systems and methods described herein may provide enhanced system security for a system, e.g., a computer system, by performing pre-boot security functions via an embedded processor and one or more pre-boot security devices, where the embedded microcontroller and the pre-boot security devices operate independently from the host or main processor of the system.

BRIEF DESCRIPTION OF THE DRAWINGS

The foregoing, as well as other objects, features, and advantages of this invention may be more completely understood by reference to the following detailed description when read together with the accompanying drawings in which:

FIG. 3 is a flowchart of a method for performing pre-boot security verification, according to one embodiment.

Figure 1:
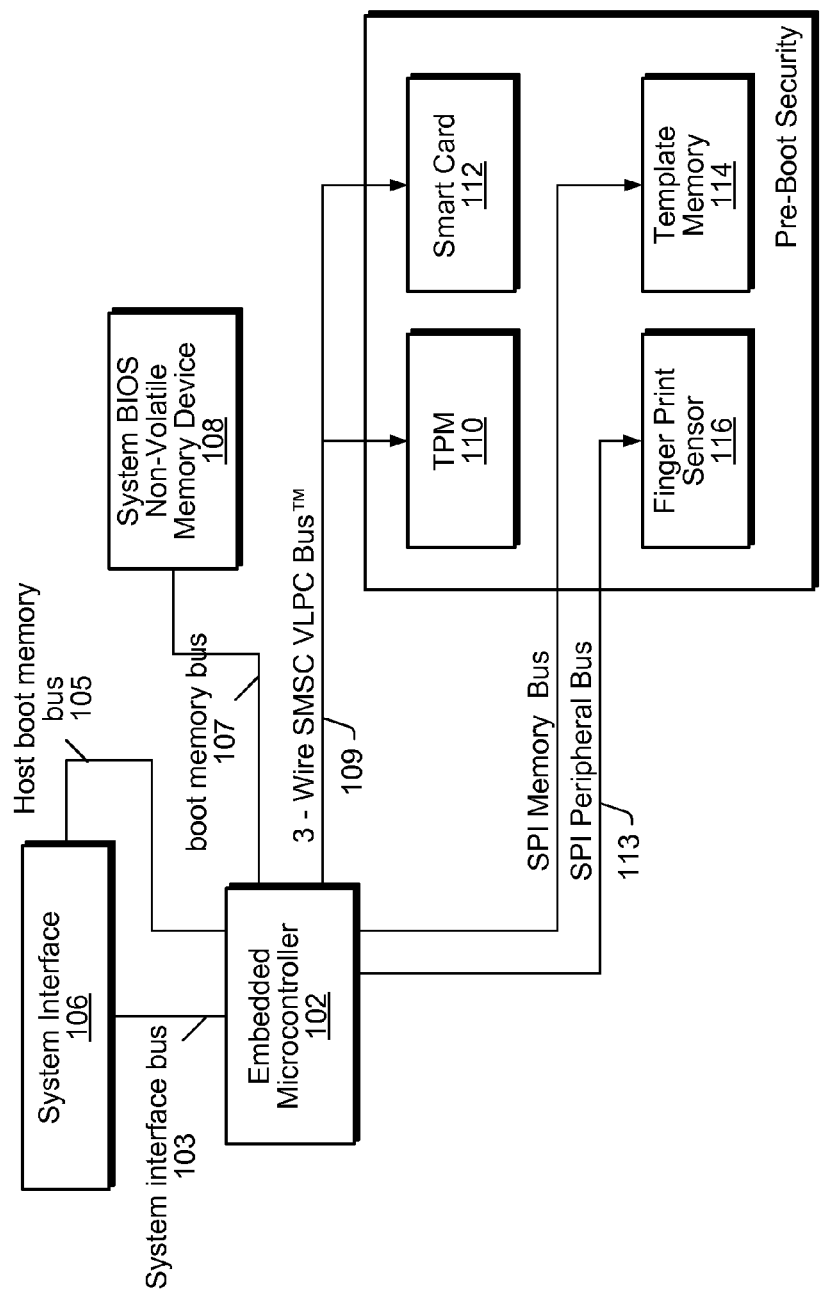
FIG. 1 is a high-level block diagram of an exemplary system configured to implement one embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "coupled" means "directly or indirectly connected".

DETAILED DESCRIPTION OF THE PREFERRED EMBODIMENTS

Below are described various embodiments of a system and method for securing a computer, e.g., during pre-boot of the system.

As used herein, a "set of instructions" may refer to one or more instructions. More specifically, in some embodiments, "instructions" may refer to programming code, software, and/or functions implemented in the form of a code that is executable by a controller, microprocessor, and/or custom logic circuit adapted to execute these instructions. In some embodiments, these instructions may comprise device drivers, control software, and/or machine code. As used herein, a "controller" refers to any type of processor, such as a central processing unit (CPU) or processor, microprocessor, or embedded microcontroller, among others.

Overview

An important feature of the present invention is to move the responsibility for verifying system security, e.g., detecting tampering, from the main CPU (i.e., processor) of a computer to an embedded microcontroller. In other words, rather than relying on the CPU of a computer for security functions, which, as noted above, is generally susceptible to attack or tampering, a separate embedded microcontroller may perform some or all of these security functions, thereby substantially increasing the security of the computer system. This ability may be enhanced by providing the embedded microcontroller with access to secure storage, such as is available with a TPM or smart card, such as the SMSC SmartCard, provided by SMSC. Such secure storage may be used to safely store information regarding the last known secure signature of the system. The embedded microcontroller may retrieve and use this information to ensure that the system BIOS (basic I/O service) and other key parts of the system have not been tampered with. This is generally part of what is called establishing the Root of Trust for the system. The embedded microcontroller may also need access to the system BIOS, which may be provided through any appropriate method, including Q-Switches, to allow intercepting the signals from the BIOS device to verify that its content is unchanged. If the embedded microcontroller is also responsible for part or all of remote system management functions (e.g., BMC (baseboard management functions) or DTMF (Distributed Management Task Force) type functions), the ability to access the secure storage, e.g., TPM, and provide remote attestation as well as verification of whom the remote request is coming from may be provided.

Security may also rely on verifying that specific users and no others have access to the system, as well as verifying the identity of users. Thus, in addition to the above system verification, access to secure identification means, e.g., a smart card, may be used to verify the identity of the user who is attempting to start up the system. For example, in some embodiments, embedded microcontrollers may provide the ability to scan fingerprints or acquire other biometric information to further enhance the ability to verify user identity.

Embodiments of the present invention may provide a system architecture that provides access to these security devices by the embedded microcontroller. It should be noted that the concepts disclosed herein may be extended to include network access to perform broader authentication functionality.

The following provides more detailed information regarding embodiments of the invention.

FIG. 1—Exemplary System

FIG. 1 is a high-level block diagram of an exemplary system configured to implement one embodiment of the present invention. While the system of FIG. 1 is directed to embodiments that utilize TPM and a smart card, e.g., an SMSC SmartCard, it should be noted that these are meant to be exemplary secure storage means only, and that other secure storage devices, components, and systems may be used as desired. The system of FIG. 1 preferably resides in a computer system, e.g., a personal computer (PC), although in other embodiments, the techniques and systems described herein may be implemented in any other systems as desired.

As FIG. 1 shows, the system may include an embedded microcontroller 102, coupled to system interface 106 via a system interface bus 103, whereby the microcontroller 102 may communicate with the CPU of the computer system, referred to as the host CPU or processor. Note that in various embodiments, this system interface 106 may simply be a connection or bus suitable for communications between the microcontroller 102 and the host CPU, or may include additional structure or functionality as desired. As indicated in FIG. 1, the microcontroller 102 may be further coupled to a system BIOS non-volatile memory device 108 that stores the system BIOS, via a boot memory bus 107, such as an SPI (serial peripheral interface) memory bus, as shown. The microcontroller 102 may be further coupled to the system interface 106 via a host boot memory bus 105, whereby the embedded microcontroller 102 may intercept memory requests or other signals transmitted between the system interface (e.g., the host CPU) and the system BIOS non-volatile memory device 108.

In preferred embodiments, the microcontroller 102 may be coupled to one or more additional buses that facilitate communications with one or more pre-boot security components. For example, in the embodiment shown, a first bus 109, in this case, a 3-wire SMSC VLPC (very low pin count) Bus™ couples the microcontroller 102 to a TPM 110 and to a smart card 112, e.g., an SMSC SmartCard, a second bus 111, in this case, an SPI (serial peripheral interface) memory bus, coupled to a template memory 114, and a third bus 113, an SPI peripheral bus, coupled to a fingerprint sensor 116. The template memory 114 may provide secure storage for information or data related to one (or more) of the other pre-boot security components. For example, in one embodiment, the template memory 114 may store fingerprint data for one or more authorized users of the system for use with the fingerprint sensor 116. Additionally, or alternatively, the template memory 114 may store identification information for authorized users that may be compared to identify information provided by a smart card, or other personal identification medium.

It should be noted that the particular components and buses shown in FIG. 1 are meant to be exemplary only, and are not intended to limit the invention to any particular number or type of components and buses. For example, other pre-boot security components contemplated include retinal scanners, voiceprint sensors, and global positioning systems, among others. Similarly, any type of bus or transmission medium may be used as desired, including, for example, one or more of serial, parallel, wired, or wireless media, among others.

Note that, as FIG. 1 shows, the system interface is communicatively coupled to the system BIOS flash device 108 via the embedded microcontroller 102, and thus BIOS signals or data may be intercepted by the embedded controller 102. Thus, the host CPU may interact with the BIOS, stored in an external flash device, and a TPM, through the embedded microcontroller (as well as any other devices on the buses coupled to the microcontroller). This intermediation between the host CPU and the BIOS and pre-boot security components by the embedded microcontroller may thus facilitate security functionality that does not rely on the host CPU for effectiveness.

Figure 2:
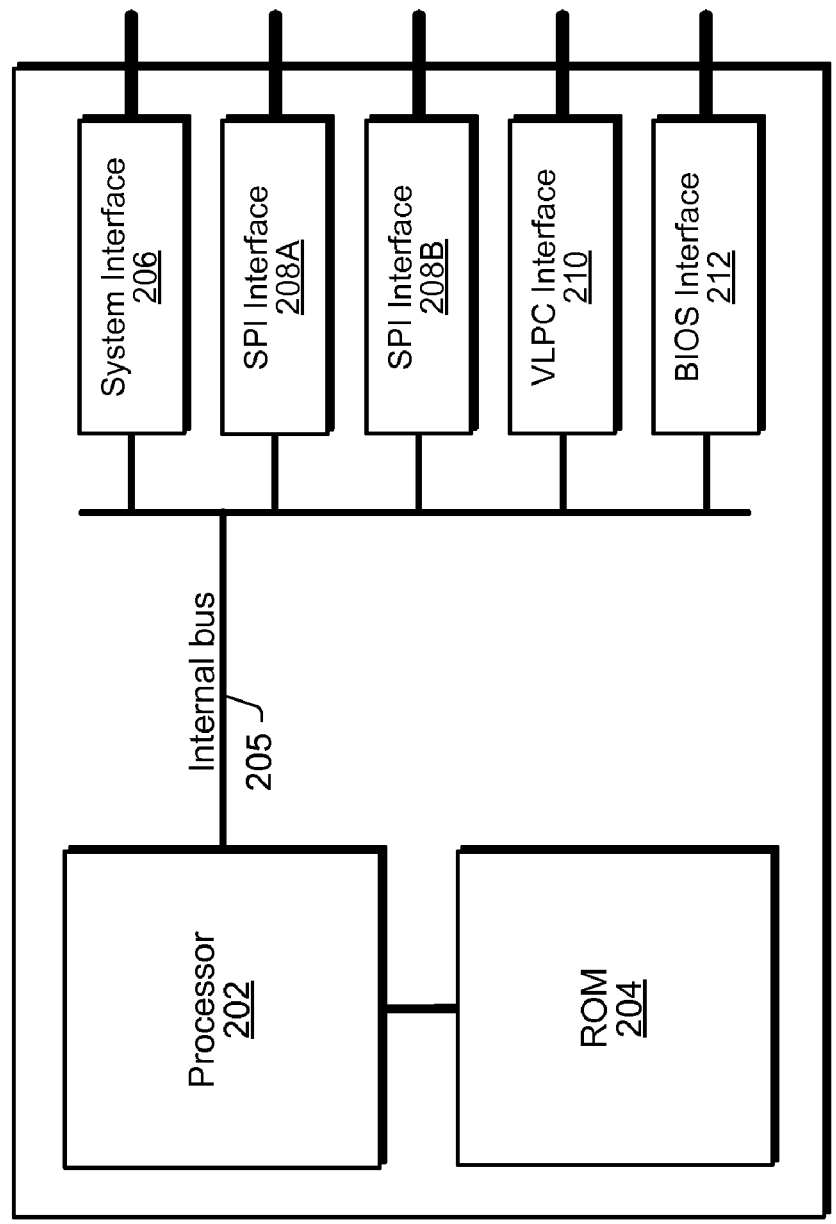
FIG. 2 is a block diagram of an embedded controller with security components, according to one embodiment.

FIG. 2—Embedded Microcontroller

FIG. 2 is a high-level block diagram of an embedded microcontroller, according to one embodiment. The embedded microcontroller shown in FIG. 2 is an exemplary embedded microcontroller suitable for use in embodiments of the system of FIG. 1. It should be noted that in other embodiments, other components, buses, and configurations may be used as desired.

As FIG. 2 indicates, in this embodiment, the embedded microcontroller includes a processor 202 coupled to a ROM (read only memory) 204, which may be referred to as auxiliary memory. As shown, the processor 202 is also coupled to an internal bus 205 that may couple to sufficient interfaces to communicate with external devices. For example, in this embodiment, the interfaces include a system interface 206, corresponding to the system interface 106 of FIG. 1, for communicating with the host CPU, two SPI interfaces 208A and 208B, for communicating with SPI peripherals, such as the template memory 114 and the fingerprint sensor 116 of FIG. 1, a VLPC interface 210, for communicating with secure storage components, such as the TPM 110 and smart card 112, and a BIOS interface 212, for communicating with the system BIOS flash device 108, e.g., with the system BIOS. Note that in the example of FIG. 2, only the interfaces required for the configuration shown in FIG. 1 are shown, but that any other interfaces may be used as desired.

Note that the TPM security device may be transparently accessible to the host CPU through the microcontroller 102, because the embedded microcontroller emulates a TPM connected directly to the system interface 106. In other words, the microcontroller, situated between the system interface 106 and the TPM 110, manages or facilitates communications between the host CPU and the TPM 110 in a transparent manner, and so from the perspective of the host CPU, the TPM 110 appears to be directed connected to the system interface 106. Moreover, because the embedded microcontroller controls host access to both the TPM and the BIOS, the processor inside the microcontroller can run an application stored in the on-chip ROM before the host CPU has an opportunity to execute BIOS code or query the TPM. Note that the code that runs inside the microcontroller is in an embedded ROM, which is not easily modified. The application, therefore, can be trusted to verify the authorization level of the system. The on-chip application can thus verify that the system is uncompromised before allowing the host to begin its normal startup routine. As will be described below in more detail, the microcontroller can use any of various means of authentication, such as biometric sensors as well as querying a TPM, to verify authorization, and if the system is found to be compromised, the microcontroller can prevent the host CPU from booting, e.g., by blocking access to the BIOS, shutting down the power supply, etc.

Applications that use the TPM to verify system security preferably reside in the on-chip ROM 204. Note that in various embodiments, this memory may be implemented in any difficult-to-modify memory. For example, in one embodiment, the memory may be true ROM, which cannot be modified, while in other embodiments, the memory (ROM 204) may be implemented in memory that is protected by hardware to make modification by unauthorized users very difficult, if not impossible.

Thus, in the embodiments represented by FIGS. 1 and 2, the embedded controller may use identification-related pre-boot security devices, such as fingerprint sensor 116 (or others), to control access to the system, and may use the TPM to provide internal system security, i.e., to confirm or verify that the state of the system is secure. Further details of such security means and processes are described below with reference to FIG. 3.

FIG. 3—Method for Verifying Security in a System

FIG. 3 is a high-level flowchart of a method for verifying security in a system, e.g., a computer system, comprising a host processor and memory, according to one embodiment. The method shown in FIG. 3 may be used in conjunction with any of the computer systems or devices shown in the above Figures, among others. In various embodiments, some of the method elements shown may be performed concurrently, in a different order than shown, or may be omitted. Additional method elements may also be performed as desired. As shown, this method may operate as follows.

In 302, upon power-up, but before host processor boot-up, an embedded microcontroller coupled to the host processor and memory may access an auxiliary memory that stores program instructions for verifying system security, and execute the program instructions to verify system security using one or more pre-boot security components coupled to the embedded microcontroller.

For example, as noted above, the auxiliary memory is preferably an on-chip ROM, or memory controlled or protected in such a way as to prohibit user-tampering with the contents of the memory. The auxiliary memory may store program instructions, e.g., one or more applications, that are executable to perform security functions for the system.

For example, in one embodiment, the one or more pre-boot security components may include at least one identity verification component, e.g., a smart card, or a biometric sensor, e.g., a fingerprint sensor, a retinal scanner, and/or a voiceprint sensor, among others. The program instructions may be executable by the embedded processor to invoke the at least one identity verification component to receive identification information from a user, and verify that the user is authorized to use the system.

For example, as noted above, in some embodiments, the system may include template memory 114 that stores template identification information for authorized users, such as personal data that may be compared to identify information provided by a smart card or other personal identification medium, and/or, in the case of biometric sensors, a reference fingerprint, retina pattern, or voiceprint, among others. The program instructions may thus be executable to receive (i.e., acquire) the identification information from the user via the at least one identity verification component, e.g., personal data from a smart card, a fingerprint from the user, etc., and compare this information to that stored in the template memory 114 to determine if the user is authorized to use the system.

In some embodiments, the one or more pre-boot security components may include at least one system verification component. The program instructions (e.g., applications) may be executable by the embedded processor to invoke the at least one system verification component to query the system for system state information, and verify that the system has not been compromised.

For example, one exemplary system verification component is a TPM (Trusted Platform Module), discussed above, that may be used to perform various system security functions. In some embodiments, the TPM may provide a toolkit comprising various functions (and/or data) that may be invoked or otherwise used by the program instructions or applications stored in the auxiliary memory (e.g., the ROM 204). For example, the microcontroller may execute an application (e.g., from ROM 204) to verify the system BIOS, e.g., via a cryptographic hash of the BIOS memory contents, as is well known in the art. Note that this functionality is facilitated by the microcontroller's direct access to BIOS, as indicated in FIG. 1.

In some embodiments, the system may store reference system state information, e.g., in template memory 114 or some other secure storage medium. In some embodiments, the reference system state information may include information regarding the last known secure signature of the system (or some portion of the system). To verify that the system has not been compromised, the program instructions may be executable by the embedded processor to compare the system state information queried by the at least one system verification component with the stored reference system state information. If the queried information matches or is in accordance with the stored reference system state information, the system (or some part of the system) may be considered secure or uncompromised. Thus, for example, the embedded microcontroller may retrieve and use this information to ensure that the system BIOS and other key parts of the system have not been compromised, i.e., tampered with. Of course, any other sub-systems of the system may be verified against tampering, etc., as desired, e.g., contents of a hard drive, ROM, etc.

As another example of system security verification, in one embodiment, the one or more pre-boot security components may include a GPS (global positioning system), as mentioned above. To verify system security using the one or more pre-boot security components, the program instructions may be executable by the embedded processor to invoke the GPS to determine the location of the system, and verify that the system is at an authorized location. For example, one or more authorized locations may be stored in a secure storage medium (e.g., the template memory 114, the TPM, etc.), and the microcontroller may execute the program instructions to compare the determined location of the system with the one or more authorized locations to determine if the system is at an authorized location.

It should be noted that any of the above-described components (and others) may be used singly or in conjunction as desired. For example, in some embodiments, the TPM may be used to verify biometric data, e.g., fingerprint data, personal data acquired from a smart card, and so forth. Thus, a TPM may be considered to be both an identity verification component and a system verification component.

In 304, if system security is verified, boot-up of the host processor may be invoked. For example, in some embodiments, the embedded processor may invoke or orchestrate the boot-up process for the host processor, e.g., invoking or calling a bootloader program, e.g., from the BIOS memory. Alternatively, in other embodiments, the host CPU boot process may be managed by another part of the system (besides the embedded microcontroller), in which case, if system security is verified, the microcontroller may permit the boot-up process for the host CPU to launch and proceed.

In some embodiments, the embedded microcontroller may be further operable to execute the program instructions to invoke one or more defensive measures if system security cannot be verified. For example, the one or more defensive measures may include preventing user access to the system, such as, for example, by preventing the host CPU from booting by blocking access to the BIOS, and/or by shutting down the power supply to the system. As another example, the one or more defensive measures may include alerting an external system coupled to the system. In preferred embodiments, the system may log all user input or interactions with the system for later analysis.

In some embodiments, the microcontroller may independently control access to devices, e.g., if access is critical to system security, and if the system is designed so that access to devices is provided through the microcontroller. Because the processor inside the microcontroller runs its own applications (e.g., from ROM), it may verify access rights to the devices, e.g., by using a TPM attached to one of its subsidiary buses (e.g., the VLPC bus) (see, e.g., FIG. 2). If the rights do not exist, access to the devices may be blocked without any modifications required to system software. Thus, in one embodiment, the embedded microcontroller may be further operable to execute the program instructions to control access to one or more devices coupled to the system. The one or more defensive measures taken when system security cannot be verified may thus include blocking access to the one or more devices. For example, as noted above, in one embodiment, at least one of the one or more pre-boot security components is or includes a TPM, and the one or more devices may include at least one other of the one or more pre-boot security components. To verify system security using the one or more pre-boot security components, the microcontroller may be operable to execute the program instructions to verify access rights using the TPM (and, as noted above, block access to the at least one other device if system security cannot be verified).

Thus, embodiments of the systems and methods described herein may provide enhanced system security for a system, e.g., a computer system, by performing pre-boot security functions via an embedded processor and one or more pre-boot security devices, where the embedded microcontroller and the pre-boot security devices operate independently from the host or main processor of the system.

We claim:

1. A system, comprising:
a host processor and memory;
an embedded microcontroller coupled to the host processor;
an auxiliary memory coupled to the embedded microcontroller, wherein the auxiliary memory stores program instructions for verifying system security; and
one or more pre-boot security components coupled to the embedded microcontroller;
wherein upon power-up, but before host processor boot-up, the embedded microcontroller is operable to:
execute the program instructions to verify system security using the one or more pre-boot security components; and
if system security is verified, permit the host processor to be booted;
wherein the embedded microcontroller is further configured to execute the program instructions to:
invoke one or more defensive measures if system security cannot be verified; and
control access to one or more devices coupled to the system, and wherein the one or more defensive measures comprises blocking access to the one or more devices; and
wherein at least one of the one or more pre-boot security components comprises a trusted platform module (TPM), wherein the one or more devices comprises at least one other of the one or more pre-boot security components, and wherein, to verify system security using the one or more pre-boot security components, the embedded microcontroller is configured to execute the program instructions to verify access rights using the TPM.

2. The system of claim 1,
wherein the one or more pre-boot security components comprise at least one identity verification component;
wherein, to verify system security using the one or more pre-boot security components, the program instructions are executable by the embedded microcontroller to invoke the at least one identity verification component to:
receive identification information from a user; and
verify that the user is authorized to use the system.

3. The system of claim 2, wherein the at least one identity verification component comprises one or more of:
a smart card;
a TPM (Trusted Platform Module); or
at least one biometric sensor.

4. The system of claim 3, wherein the at least one biometric sensor comprises one or more of:
a fingerprint sensor;
a retinal scanner; or
a voiceprint sensor.

5. The system of claim 1, wherein the one or more pre-boot security components comprise at least one system verification component;
wherein, to verify system security using the one or more pre-boot security components, the program instructions are executable by the embedded microcontroller to invoke the at least one system verification component to:
query the system for system state information; and
verify that the system has not been compromised.

6. The system of claim 5, wherein to verify that the system has not been compromised, the program instructions are executable by the embedded microcontroller to compare the system state information queried by the at least one system verification component with reference system state information.

7. The system of claim 5, wherein the at least one system verification component comprises a TPM (Trusted Platform Module).

8. The system of claim 1, wherein the auxiliary memory comprises a ROM.

9. The system of claim 1, wherein the auxiliary memory comprises a memory protected by hardware to implement one-time writable memory.

10. The system of claim 1, wherein the one or more defensive measures comprises:
  preventing user access to the system.

11. The system of claim 10, wherein said preventing user access to the system comprises one or more of:
  preventing the host processor from booting by blocking access to a BIOS;
  shutting down a power supply to the system.

12. The system of claim 1, wherein the one or more defensive measures comprises:
  alerting an external system coupled to the system.

13. The system of claim 1,
  wherein the one or more pre-boot security components comprise a global positioning system (GPS); and
  wherein, to verify system security using the one or more pre-boot security components, the program instructions are executable by the embedded microcontroller to:
    invoke the GPS to determine the location of the system; and
    verify that the system is at an authorized location.

14. A method for verifying security in a computer system comprising a host processor and memory, the method comprising:
  upon power-up, but before host processor boot-up, an embedded microcontroller coupled to the host processor and memory accessing an auxiliary memory that stores program instructions for verifying system security, and executing the program instructions to verify system security using one or more pre-boot security components coupled to the embedded microcontroller;
  if system security is verified, invoking boot-up of the host processor;
  if system security cannot be verified, invoking one or more defensive measures; and
  controlling access to one or more devices coupled to the system, wherein the one or more defensive measures comprises blocking access to the one or more devices;
  wherein at least one of the one or more pre-boot security components comprises a trusted platform module (TPM), wherein the one or more devices comprises at least one other of the one or more pre-boot security components, and wherein executing the program instructions to verify system security using the one or more pre-boot security components comprises executing the program instructions verify access rights using the TPM.

* * * * *